(12) United States Patent
Spaniol

(10) Patent No.: US 7,704,448 B2
(45) Date of Patent: Apr. 27, 2010

(54) HIGH TEMPERATURE-RESISTANT NIOBIUM WIRE

(75) Inventor: Bernd Spaniol, Hammersbach (DE)

(73) Assignee: W.C. Heraeus GmbH, Hanau (DE)

( * ) Notice: Subject to any disclaimer, the term of this patent is extended or adjusted under 35 U.S.C. 154(b) by 0 days.

(21) Appl. No.: 11/071,795

(22) Filed: Mar. 3, 2005

(65) Prior Publication Data

US 2005/0199321 A1  Sep. 15, 2005

(30) Foreign Application Priority Data

Mar. 4, 2004  (DE) .................. 10 2004 011 214

(51) Int. Cl.
*B22F 5/12* (2006.01)
(52) U.S. Cl. .......................... 419/28; 419/30
(58) Field of Classification Search .................. 75/245, 75/230; 148/565, 668; 419/10, 28
See application file for complete search history.

(56) References Cited

U.S. PATENT DOCUMENTS

| 4,084,965 | A |   | 4/1978  | Fry |
| 5,171,379 | A | * | 12/1992 | Kumar et al. ............... 148/422 |
| 6,165,623 | A |   | 12/2000 | Fife et al. |
| 6,358,625 | B1 |  | 3/2002  | Kumar et al. |
| 6,375,704 | B1 |  | 4/2002  | Habecker et al. |
| 6,593,532 | B1 | * | 7/2003  | Goldberg et al. ......... 174/110 A |
| 2004/0089100 | A1 | * | 5/2004 | Fife ........................... 75/244 |
| 2004/0149356 | A1 |   | 8/2004 | Spaniol |
| 2004/0212948 | A1 | * | 10/2004 | Naito et al. ................. 361/311 |
| 2009/0084500 | A1 | * | 4/2009 | Sawayama et al. ....... 156/345.1 |

FOREIGN PATENT DOCUMENTS

| DE | 198 47 012 A1 | 4/2000 |
| DE | 103 04 756 A1 | 11/2004 |
| WO | WO 2004/003949 | 1/2004 |

OTHER PUBLICATIONS

European Search Report (EPO Form 1507.0) 3 pgs., dated Apr. 19, 2005.

* cited by examiner

*Primary Examiner*—Roy King
*Assistant Examiner*—Ngoclan T Mai
(74) *Attorney, Agent, or Firm*—Norris McLaughlin & Marcus, P.A.

(57) ABSTRACT

High temperature-resistant niobium wire enriched with phosphorous is suitable as a connecting wire for niobium, niobium oxide, or tantalum capacitors.

6 Claims, 2 Drawing Sheets

HIGH TEMPERATURE-RESISTANT NIOBIUM WIRE

The invention relates to a high temperature-resistant niobium wire, a method for its production, and its use for connection to niobium, niobium oxide, or tantalum capacitors.

For the electrical connection of metal powder capacitors, wires made of refractory metals are used. Through the use of coarser, and thus less expensive, niobium powder in the production of niobium capacitors, sintering temperatures of >1,400° C. have been used up to now. As a rule, tantalum wires withstand these high temperatures. However, tantalum has approximately twice the density of niobium, which leads to high consumption of material. The finished capacitor, whose powder material consists essentially of niobium, as well as production waste from sintered blanks, cannot be separated economically from tantalum in order to feed the niobium once again to a recycling process. Niobium wires would solve this problem. Moreover, the price of tantalum is subject to great market fluctuations so that the costs for the precursor material are difficult to calculate and control. In sum, it is thus desirable to have available an economical alternative material based on niobium. Due to the stable price of niobium as precursor material, the use of niobium connecting wires would also be desirable in tantalum capacitors.

For undoped niobium, its use as solder for tantalum and tungsten up to 1,600° C. is known (Werner Espe, Werkstoffkunde der Hochvakuumtechnik [=Materials Science in High-vacuum Technology], Vol. 1, Metalle und metallisch leitende Werkstoffe [=Metals and Metallically Conducting Materials], Volkseigener Betrieb Deutscher Verlag der Wissenschaften [=People's Enterprise German Scientific Press], 1959). In the case of this use however, neither fine-grain stability nor stability against embrittlement and fracture under "back-and-forth bending stress" are called for.

Niobium wires were also recommended for the connection of powder anodes. U.S. Pat. No. 6,358,625 B1 describes, for example, anode wires made of niobium or tantalum which are treated with oxygen to improve their adhesion so that the result is an enrichment on the surface on the order of magnitude of 35% on an atomic basis with a thickness of approximately 50 nm. Normally, niobium and tantalum wires contain only slight amounts of oxygen. For tantalum, oxygen contents of 50-600 µg/g are specified. The surface enrichment does not have an effect on the properties in general, such as conductivity, but does increase adhesion. Sintering temperatures of 1,250° C. are specified. Oxygen-doped niobium wires, as described, for example, in DE 103 04 756, have their limit for use at approximately 1,300° C.

Thus, it is technologically important to find a suitable material based on niobium, said material withstanding, without coarse grain formation, temperatures of over 1,400° C. during use, and at the same time having electrical properties comparable to pure niobium. The material should furthermore not become brittle or break, in order to withstand the bending processes during the production of capacitors.

Surprisingly, it has been found that even small additions of phosphorous exert a significant influence on the recrystallization temperature, on the beginning of coarse grain formation, and on the progress of coarse grain formation in the case of niobium.

BRIEF DESCRIPTION OF THE DRAWINGS

The invention will now be described in greater detail with reference to the drawings, wherein.

Figure 1:
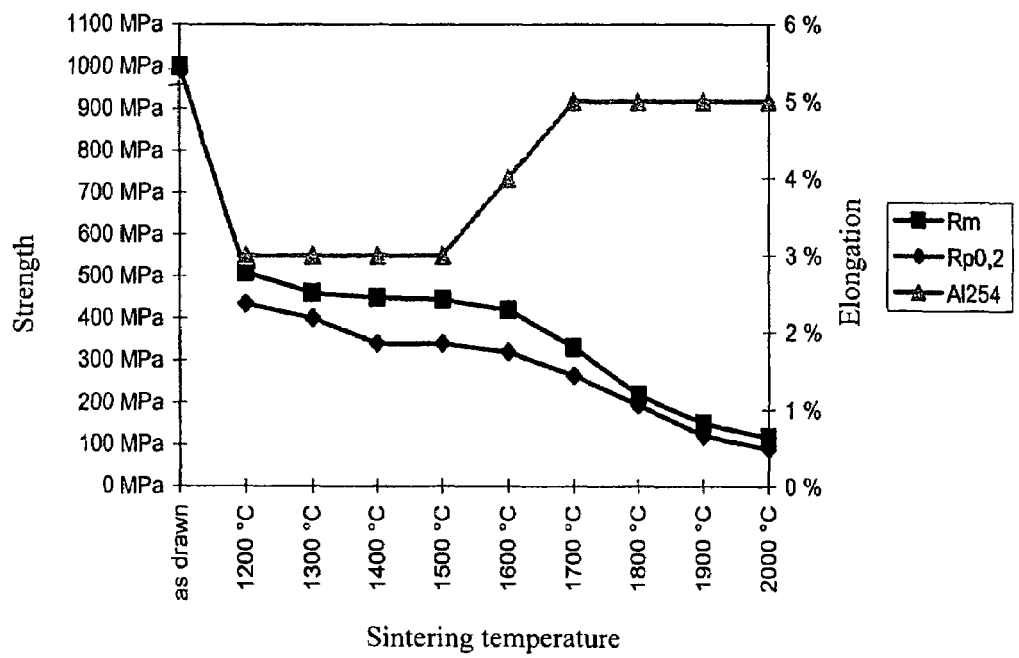
FIG. 1 comprises two graphs, the first of which (A) depicts the strength of a phosphorus-doped niobium wire according to the present invention as a function of sintering temperature, and the second of which (B) depicts the grain size of a phosphorus-doped niobium wire according to the present invention also as a function of sintering temperature.
Figure 1:
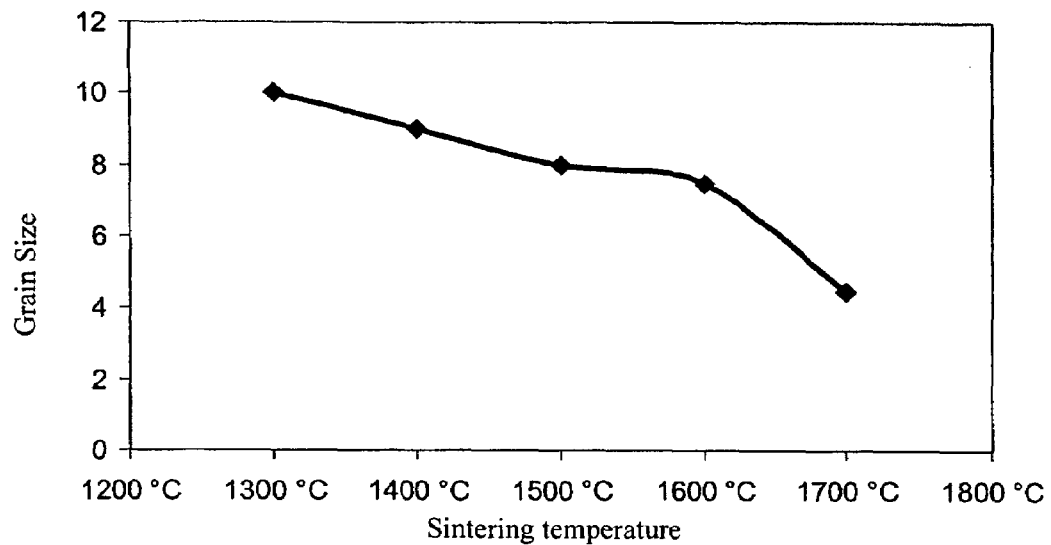

Niobium doped with phosphorous shows, in an annealing at 1,400° C. for 20 minutes, a grain size of ASTM 9. Comparable grain size is achieved in the case of niobium doped with oxygen at 1,200° C., in the case of undoped niobium with oxygen at 900° C. A noticeable grain coarsening occurs in the case of niobium-phosphorous only at temperatures over 1,600° C.

At 1,600° C. grain sizes of ASTM 5 are still achieved.

With the material according to the invention there is a universal possibility for use of niobium wires in niobium capacitors. Since the material shows no massive coarse grain formation and does not become brittle even up to 1,600° C., there is in addition the possibility for use in tantalum capacitors. That is interesting in particular in the case of the smaller types since there the tantalum wire costs contribute significantly to the costs.

The doping of the niobium is done, for example, during the
    electron-beam melting by the addition of phosphorous or
        phosphorous-containing prealloys, or
arc melting by the addition of phosphorous or phosphorous-containing prealloys, or
sinter block production from niobium powder by the addition of phosphorous or phosphorous-containing prealloys or
sinter block production from niobium powder already doped with phosphorous.

The phosphorous-containing alloy resulting can be processed at room temperature into wire with diameters of 0.15 to 0.4 nm. The wires are preferably used as connecting wires in niobium, niobium oxide, or tantalum capacitors. Such capacitors are produced from metallic powder. After sintering (together with the wire), the metal is "formed" on the surface, i.e. anodically oxidized, so that an extremely thin $Nb_2O_2$ layer or $Ta_2O_5$ layer is formed as the dielectric.

The following example explains the invention in more detail without restricting it.

A niobium melting block is doped with phosphorous by electron-beam melting with the homogeneous addition of a prealloy containing approximately 10% phosphorous. The result is a niobium alloy with a phosphorous content of 100 to 2,000 µg/g. The niobium alloy thus produced is drawn at room temperature into wire with diameters of 0.15 to 0.4 nm.

By means of annealing experiments that simulate the actual sintering process in the production of capacitors, the high temperature-resistance of the alloy can be demonstrated. Niobium ("Nb standard") and niobium with 3000 µg/g oxygen ("NbO") serve as reference samples.

The results are summarized in the following table:

| Niobium quality: | Annealing temperature: | Resulting grain size according to ASTM | Bending number alternating back and forth |
|---|---|---|---|
| Nb Standard | 900° C. | 7 | >10 |
| Nb Standard | 1,000° C. | 4 | 5 |
| NbO | 900° C. | 12 | >10 |

-continued

| Niobium quality: | Annealing temperature: | Resulting grain size according to ASTM | Bending number alternating back and forth |
|---|---|---|---|
| NbO | 1,200° C. | 7 | 8 |
| NbO | 1,300° C. | 4 | 2 |
| NbP | 900° C. | Deformation structure | Not determined |
| NbP | 1,200° C. | 9 | >40 |
| NbP | 1,300° C. | 9 | >40 |
| NbP | 1,400° C. | 9 | >40 |
| NbP | 1,500° C. | 8 | >40 |
| NbP | 1,600° C. | 7 | >20 |
| NbP | 1,700° C. | 4 | >20 |
| NbP | 1,800° C. |  | 15 |
| NbP | 1,900° C. |  | 12 |
| NbP | 2,000° C. |  | 12 |

The experiments show a grain stability up to approximately 1,500° C. From 1,600° C., a grain coarsening begins. The mechanical properties (bending number) are, after a sintering at 1,600° C., sufficient to ensure problem-free processing in the production of capacitors.

Figure 2:
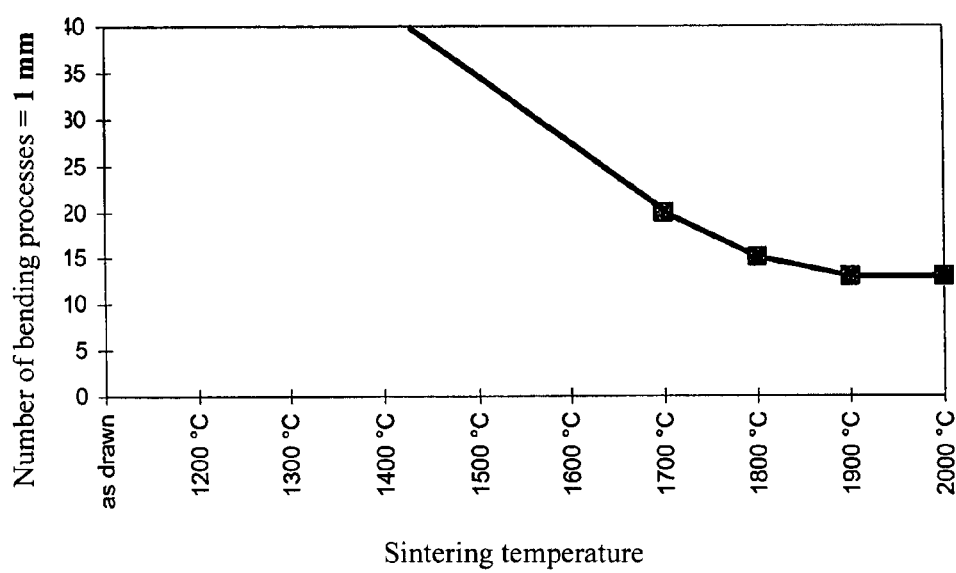
FIG. 2 is a graph depicting the bending number of a phosphorus-doped niobium wire according to the present invention as a function of sintering temperature.

FIGS. 1 and 2 show the mechanical properties strength and elongation, the grain size (ASTM), and the bending number (bilateral bending) of the phosphorous-doped niobium according to the invention as wire with 0.24 mm diameter after 20-minute sintering at various temperatures. In this example wire, the phosphorous content is 350 µg/g.

(Rm=tensile strength, Rp0.2=0.2% elongation limit, A1254=strain at break relative to a starting length of 254 mm)

What is claimed is:

1. Method for the production of high temperature-resistant niobium wire enriched with phosphorous, said wire having a phosphorus content of approximately 50 µg/g to approximately 2000 µg/g, said method comprising the following steps:
   a) obtaining a material consisting essentially only of niobium and phosphorus by:
      i) doping niobium with phosphorous by electron-beam melting, arc melting, or sintering with the addition of phosphorous or phosphorous-containing prealloys, or
      ii) sintering niobium powder already doped with phosphorous, and
   b) drawing a wire from the material obtained.

2. Method according to claim 1, wherein the wire has a diameter of 0.2 to 0.4 mm.

3. Method according to claim 1, wherein the drawing of the wire is done at room temperature.

4. Method according to claim 3, wherein the phosphorus content in said wire ranges from approximately 100 µg/g to approximately 2000 µg/g.

5. Method according to claim 3, wherein the phosphorus content in said wire ranges from approximately 350 µg/g to approximately 2000 µg/g.

6. A method of preparing a niobium, niobium oxide or tantalum capacitor, said method comprising the following steps:
   a) producing a high temperature-resistant niobium wire enriched with phosphorous according to the method of claim 1; and
   b) incorporating said wire into a niobium, niobium oxide or tantalum capacitor.

* * * * *